United States Patent
McDowell

(10) Patent No.: US 6,421,000 B1
(45) Date of Patent: Jul. 16, 2002

(54) GPS MULTIPATH MITIGATION USING A MULTI-ELEMENT ANTENNA ARRAY

(75) Inventor: Charles E. McDowell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/591,099

(22) Filed: Jun. 8, 2000

(51) Int. Cl.[7] .............................................. H04B 7/185
(52) U.S. Cl. ........................ 342/357.06; 342/357.02; 342/352; 342/359; 342/424; 342/725; 342/757; 342/357.08; 701/215; 702/5; 375/343; 375/355
(58) Field of Search ............................ 342/375.02, 359, 342/352, 424, 725, 757, 357.06, 357.01, 386, 457, 357.08; 375/343, 355, 367, 137, 130, 145, 147, 150; 455/65, 296; 701/215; 702/5

(56) References Cited

U.S. PATENT DOCUMENTS

| | | | |
|---|---|---|---|
| 5,347,286 A | * 9/1994 | Babitch | 342/359 |
| 5,467,271 A | * 11/1995 | Abel et al. | 702/5 |
| 5,493,588 A | * 2/1996 | Lennen | 375/343 |
| 5,630,208 A | * 5/1997 | Enge et al. | 455/65 |
| 5,854,815 A | * 12/1998 | Lennen | 375/343 |
| 5,907,578 A | * 5/1999 | Pon et al. | 375/208 |
| 5,990,826 A | * 11/1999 | Mitchell | 342/375.06 |
| 6,201,491 B1 | * 3/2001 | Brunolli et al. | 341/144 |

FOREIGN PATENT DOCUMENTS

GB 2353648 A * 2/2001

OTHER PUBLICATIONS

Xiaowu et al., The new demodulate technology of fiber optics gyroscope, IEEE, 2000, pp. 1416–1419.*
Mouly et al., Analytical evaluation of radiation patterns of a TACAN antenna, IEEE, 1989, pp. 187–192.*

* cited by examiner

Primary Examiner—William A. Cuchlinski, Jr.
Assistant Examiner—McDieunel Marc
(74) Attorney, Agent, or Firm—Nathan O. Jensen; Kyle Eppele

(57) ABSTRACT

A method and apparatus for mitigating multipath signal distortion using a multi-element antenna array is provided. The multi-element antenna array is used to discriminate between the desired signal and its multipath components based on spatial angle of arrival. A reference signal, provided by the positioning system receiver, is used to compute element weightings that are utilized to null out the multipath components before they reach the receiver.

27 Claims, 3 Drawing Sheets

GPS MULTIPATH MITIGATION USING A MULTI-ELEMENT ANTENNA ARRAY

BACKGROUND OF THE INVENTION

The present invention relates generally to signal error reduction in positioning systems such as the Global Positioning System (GPS), Global Navigation Satellite system (GLONASS), terrestrial or aircraft based pseudolytes, and the like, and more specifically to a method and apparatus for mitigating multipath signal distortion using a multi-element antenna array.

A significant cause of error in navigation/positioning systems is signal multipath propagation or multipath. Multipath is the interference caused by reflected positioning system signals arriving at the receiver, typically because of nearby structures or other reflective surfaces. For instance, in an aircraft environment, a positioning system signal may be reflected from various structural components of the aircraft fuselage. These reflected elements are received by the positioning system receiver along the desired direct path signal. The reflected signals may differ from the direct path signal in delay, amplitude, and phase, causing signal distortion and, consequently, positioning and navigation errors.

If the path of the reflected signal is considerably longer than the direct path such that the two patterns of signals can be separated, then the multipath effect can be substantially reduced by signal processing techniques. However, in-chip multipath cannot be easily distinguished from the direct path. Partial correlation with one or more multipath signals in addition to the desired, or direct, signal causes the correlation peak to shift leading to pseudorange error and thus signal distortion.

Consequently, it would be advantageous to provide a method and apparatus for mitigating multipath signal distortion in positioning systems such as the Global Positioning System (GPS), Global Navigation Satellite System (GLONASS), terrestrial or aircraft based pseudolytes, or the like.

SUMMARY OF THE INVENTION

Accordingly, the present invention is directed to a method and apparatus for mitigating multipath signal distortion in navigation/positioning systems such as the Global Positioning System (GPS), Global Navigation Satellite System (GLONASS), terrestrial or aircraft based pseudolytes, and the like, using a multi-element antenna array. The multi-element antenna array is used to discriminate between the directed signal and its multipath components based on spatial angle of arrival. A reference signal, provided by the positioning system receiver, is used to compute element weightings that are utilized to null out the multipath components before they reach the receiver.

In accordance with one aspect of the invention, a system for mitigating multipath distortion in a navigation/positioning system signal is described. In an exemplary embodiment, the system comprises a multi-element antenna array capable of receiving a positioning system signal including a direct path component and at least one multipath component. The multi-element antenna array includes at least three antenna elements wherein each antenna element yields an element path signal based on the received positioning system signal. A signal processing section is coupled to the multi-element antenna array. The signal processing section is capable of multiplying each element path signal by a complex weight and summing the weighted element path signals for generating an antenna pattern, each antenna pattern corresponding to a positioning system signal source. In exemplary embodiments of the invention, the system may be implemented as the antenna and radio frequency (RF) section of the navigation/positioning system receiver.

In accordance with a further aspect of the invention, a method for mitigating multipath distortion in a navigation/positioning system signal is described. In an exemplary embodiment the method comprises the steps of receiving a positioning system signal including a direct path component and at least one multipath component utilizing a multi-element antenna having at least three antenna elements wherein each antenna element yields an element path signal based on the received positioning system signal, multiplying each element path signal by a complex weight, and summing the weighted element path signals for generating an antenna pattern wherein each antenna pattern corresponds to a positioning system signal source.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principle of the invention.

BRIEF DESCRIPTION OF THE DRAWINGS

The numerous objects and advantages of the present invention may be better understood by those skilled in the art by reference to the accompanying figures in which.

DETAILED DESCRIPTION

The present invention mitigates positioning system multipath signal distortion utilizing a multi-element antenna array to discriminate between the desired signal and it's multipath components based on spatial angle of arrival. A reference signal, provided by the global positioning system receiver, is used to compute element weightings that are utilized to null out the multipath components before they reach the navigation positioning system receiver. Reference will now be made in detail to the presently preferred embodiments of the invention, examples of which are illustrated in the accompanying drawings.

System Architecture

Figure 1:
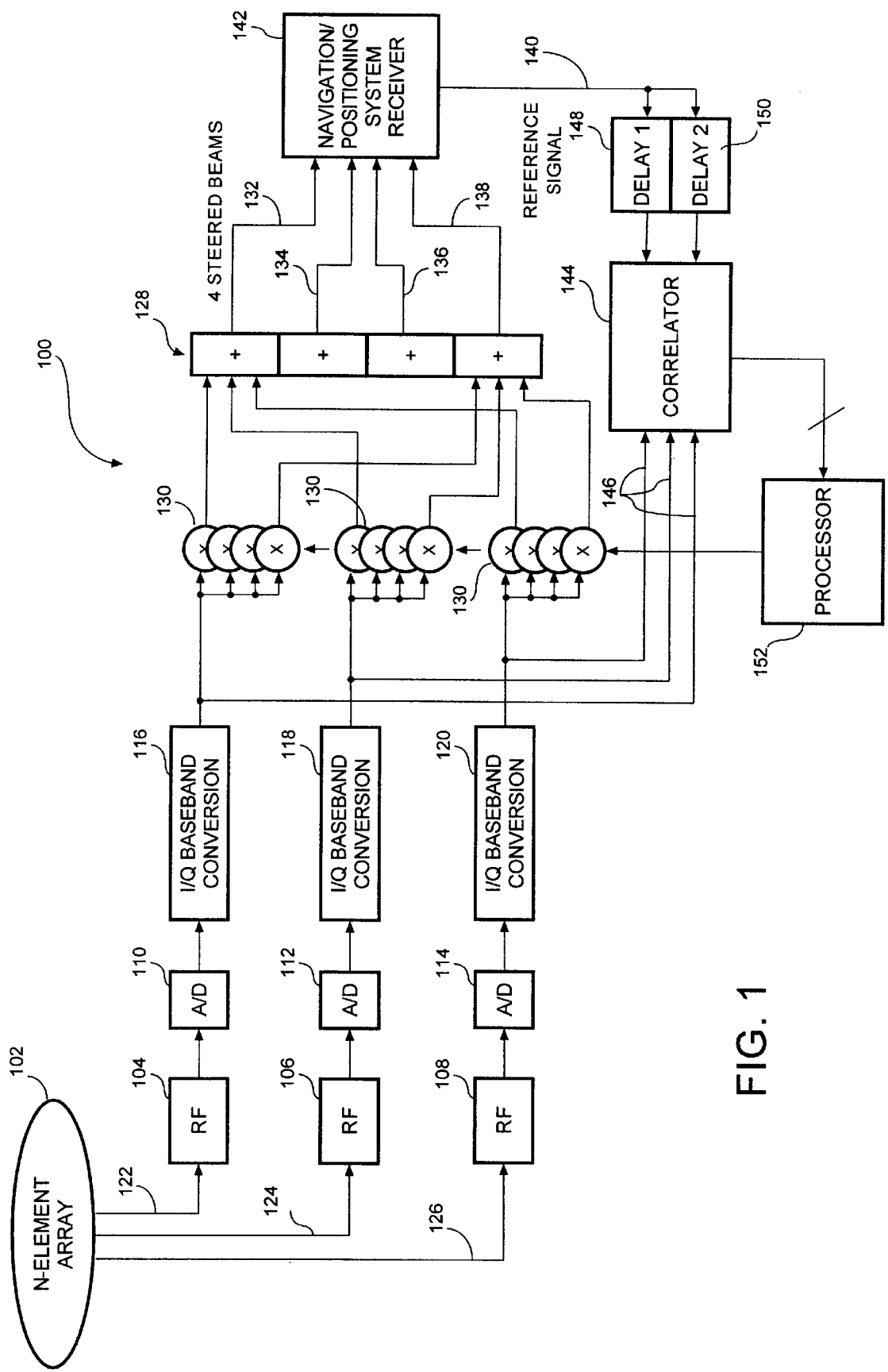
FIG. 1 is a block diagram illustrating a multipath cancellation architecture utilizing a multi-element antenna array in accordance with an exemplary embodiment of the present invention.

Referring now to FIG. 1, a system and method for mitigating multipath signal distortion in accordance with an exemplary embodiment of the invention are described. The architecture 100 of the system includes a multi-element antenna array 102 comprised of three or more antenna elements. The multi-element antenna array 102 is suitable for receiving positioning signals from one or more navigation/positioning system signal sources or transmitters such as one or more satellites of a space-based radio-navigation system such as the Global Positioning System (GPS) or Global Navigation Satellite System (GLONASS), terrestrial or aircraft based pseudolytes, or the like as contemplated by one of ordinary skill in the art. In FIG. 1, an antenna array 102 comprising three antenna elements is shown. However, it will be appreciated that multi-element antenna arrays having four or more and up to N antenna elements may be utilized without departing from the scope and spirit of the present invention.

In one embodiment, each antenna element of antenna array 102 may be followed by a radio frequency (RF) downconverter 104, 106 & 108, an analog-to-digital converter 110, 112 & 114, and a baseband I/Q filter 116, 118 & 120 in antenna element paths 122, 124 & 126. Each of these antenna element paths 122, 124 & 126 is coupled to a signal processing section 128 capable of processing each element path 122, 124 & 126 to provide an antenna pattern corresponding to a navigation/positioning system signal source or transmitter such as GPS or GLONASS satellite, or the like. This processing is comprised of multiplying each element path 122, 124 & 126 by a complex number, or weight, and adding the results together to generate an antenna pattern corresponding to a positioning system signal source or transmitter. FIG. 1 shows four sets of weights 130 which allows for the generation of four different antenna patterns 132, 134, 136 & 138, each corresponding to a positioning system signal source. Thus, the architecture shown in FIG. 1 would be capable of providing multipath free signals for four different signal sources such as four different GPS satellites. However, it will be appreciated that more or less than four patterns could be generated depending on the requirements of the application. In embodiments of the invention employing an inertial measurement unit (IMU), the antenna patterns could further be optimized to provide additional antenna gain in the direction of the selected sources (e.g., satellites).

In an exemplary embodiment of the invention, the complex weights 130 are derived using reference signals 140 returned from the navigation/positioning system receiver 142 such as a GPS receiver, or the like. These reference signals 140 are passed though a correlator 144 that correlates them with the input data stream 146 from each antenna element of antenna array 102 via antenna element paths 122, 124 & 126. The navigation/positioning system receiver 142 returns as many reference signals 140 as there are antenna patterns in the architecture. For example, a system having the architecture 100 shown in FIG. 1 would require four reference signals to be returned from the navigation/positioning system receiver 142.

The relative timing of the input data streams 146 and the reference signals 140 are controlled such that the reference signals 140 are delayed by multiples of one chip relative to the direct path signal component of the input data streams 146. Based on simulations (see FIGS. 3 and 4), it has been discovered that a delay of one and two chips for example, utilizing one and two chip delays 148 & 150, as shown in FIG. 1, provides good results. By delaying the reference signal 140 by one chip from the direct path signal component, the correlation outputs primarily receiving contributions from the multipath components and none from the direct path component. More specifically, wherein the reference signal 140 is delayed by one chip, correlation output receives components from multipath arriving between 0 (epsilon) and two chips after the direct path component. Similarly, wherein the reference signal 140 is delayed two chips, the correlator 144 receives contributions from multipath arriving between one and three chips after the direct path component.

The correlator 144 determines a vector of complex correlation values for each delay 148 & 150 so that a correlation matrix may be generated and provided to a processor 152. Because the source is multiple copies of the same signal at the same frequency, and assuming $\underline{c}$ is a row vector of correlation values received from the correlator 144, the correlation matrix (R) is constructed as $$R=\underline{c}'\underline{c}$$

where the symbol "'" represents conjugate transpose. The complex weights may then be determined by $$\underline{w}=\text{inv}(3R_n+N)\underline{v}$$

where $\underline{w}$ is the vector of complex weights, R are the correlation matrices associated with 1 through n chip delays, $\underline{v}$ is the steering vector (i.e., the vector of complex weights specifying the phasing of the elements associated with the angle of arrival to the desired satellite) and N is a real valued matrix with values only on the diagonal. N represents the contribution of thermal noise to the correlation matrix. Further, N determines the relative importance of gain versus nulling in the computation of the weights. It will be noted that the equation for $\underline{w}$ determines the relative values of the elements of $\underline{w}$. Thus, the vector can be multiplied by a constant resulting in an equally valid set of weights.

For the exemplary embodiment shown in FIG. 1, wherein delays of 1 chip and 2 chips are utilized, the complex weights are determined from $$\underline{w}=\text{inv}(R_1+R_2+N)\underline{v}$$

where $R_1$ is the correlation matrix associated with one chip delay and $R_2$ is the correlation matrix associated with two chip delay. This weight computation is performed a number of times equal to the number of antenna patterns being generated. Further, the process is repeated at an update rate dictated by the platform (and multipath generator) dynamics.

One advantage of the architecture of the present system 100 is that it does not provide a separate spatial null toward each multipath source. Rather, the system architecture 100 relies on the fact that the frequency is identical, resulting in multiple sources appearing to come from a single direction. In a sense, the system architecture 100 cancels multiple multipath sources against each other. Consequently, it is not necessary to have N antenna elements to cancel N-1 multipath sources, although simulation results have shown improved performance with more elements. However, wherein the delay spread is wide, for example, wherein the system encounters one delay at 0.5 chips and another at 1.5, elimination of multipath distortion may not be completely canceled utilizing only a 1 chip delay because the architecture can only cancel two multipath sources against each other when the chips largely overlap. The correlator spaced one chip out would see correlation from both sources, but they are completely uncorrelated with each other. However, the addition of the second correlation (at 2 chips delay) provides effective elimination of multipath.

In exemplary embodiments of the invention, the system architecture 100 may be implemented as the antenna and radio frequency (RF) section of a navigation/positioning system receiver such as a GPS or GLONASS receiver, or the like. However, other implementations of the present invention are possible and are considered within the scope and spirit of the present invention. Further, it should be appreciated that the present invention may be combined with anti-jam architectures that employ multi-element antenna arrays to provide a system having both anti-jam and anti-multipath functionality.

Simulation Results

Figure 2:
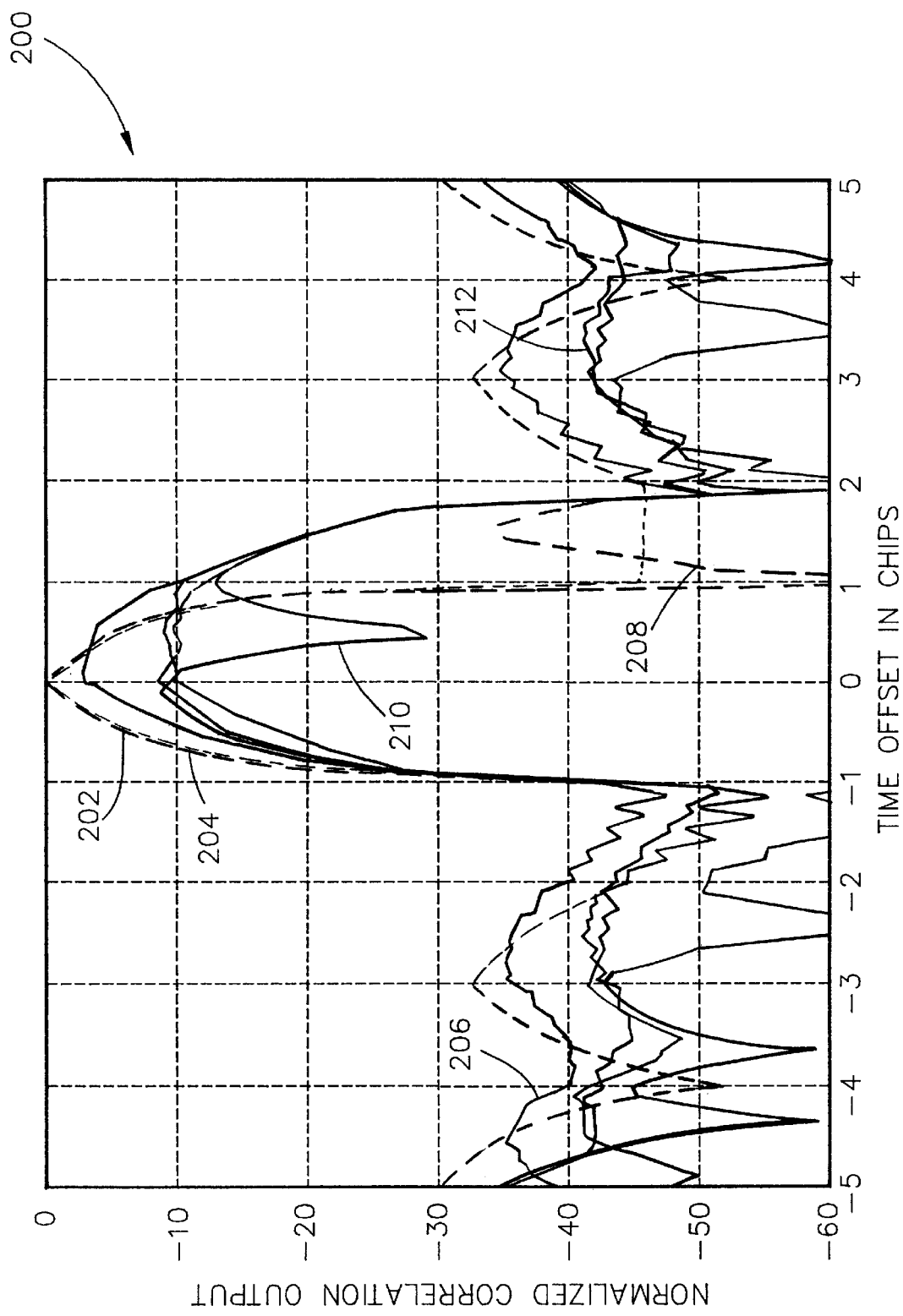
FIG. 2 is a graph illustrating before and after correlation functions of exemplary embodiments the architecture of the present invention utilizing in a decibel (dB) scale.
Figure 3:
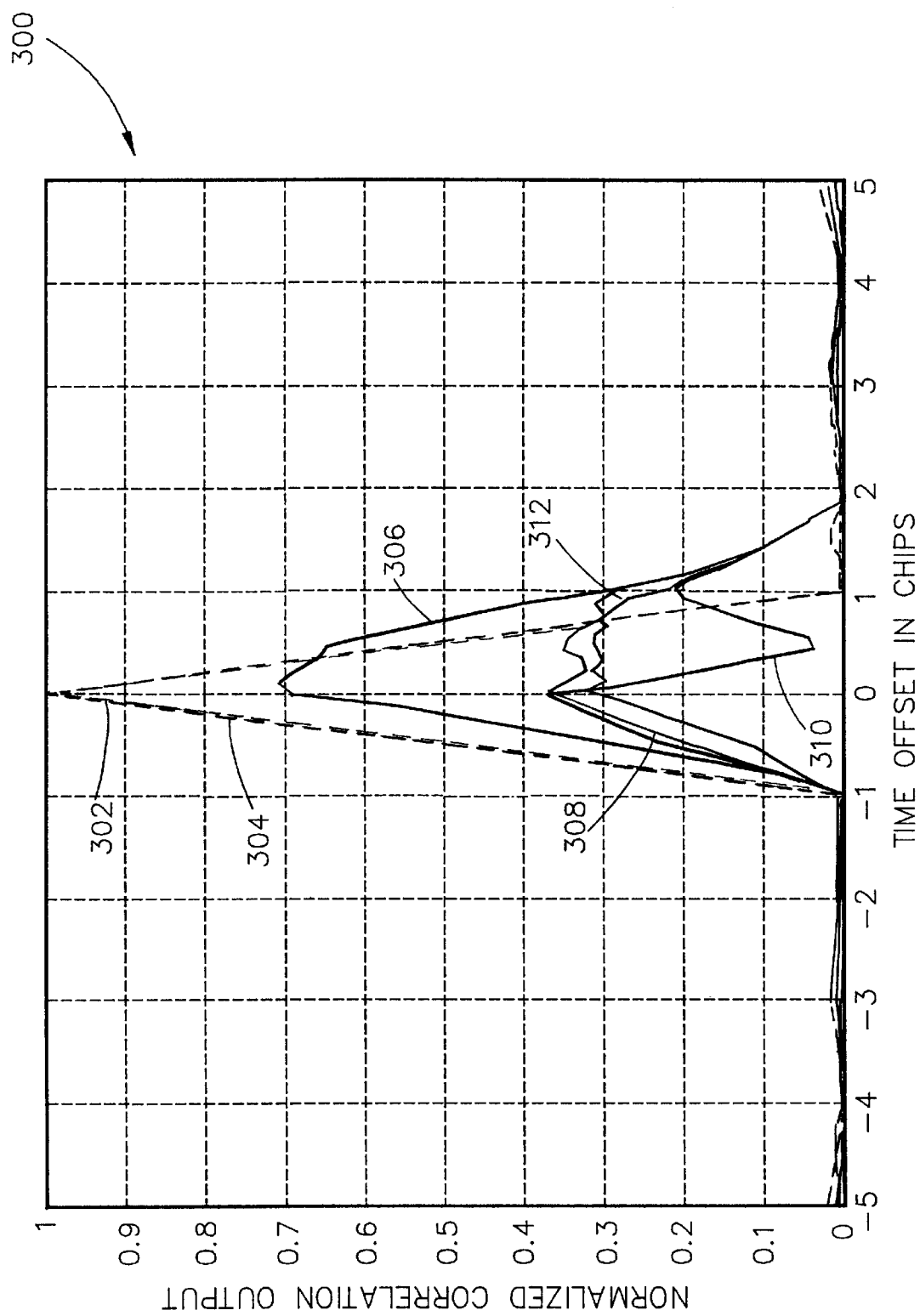
FIG. 3 is a graph illustrating before and after correlation functions of exemplary embodiments the architecture of the present invention utilizing a linear scale.

Referring now to FIGS. 2 and 3, the results of simulations testing the performance capabilities of the exemplary system architecture shown in FIG. 1 are discussed. In FIGS. 2 and 3, a seven (7) element array is used for the simulation and a direct path source plus three multipath sources are modeled. FIG. 2 shows before and after results on a decibel (dB) scale 200, while FIG. 3 shows the same results in a linear scale 300. There are a number of curves depicted. Curves 202, 302 show the correlation output after processing. Also shown are curves 204, 304 representing the ideal correlation based on the direct path alone. The other curves (curves 206–212, 306–312 are shown) are the correlation functions that would be seen from each element alone, with no processing.

The input conditions for the simulations are:

| | |
|---|---|
| Direct path: | 10 degrees azimuth, 42 degrees elevation. |
| Multipath azimuth: | 65, 92, 135 degrees. Elevation: 12, 13, 14 degrees. |
| Multipath power: | 6 dB down (half amplitude) relative to direct. |
| Multipath delays: | 0.1, 0.5, and 0.9 chips. |

The simulation is run at nine (9) samples per chip and no filtering or radio frequency (RF) effects are modeled. FIGS. 2 and 3 show exceptional cancellation, with the output curve matching the ideal curve beyond 30 dB down.

The simulation results shown in FIGS. 2 and 3 assume the ability to know the timing of the direct path in order to adjust the delay of the reference signals. However, in the timing of the direct path cannot be known. If the architecture does not naturally converge with no additional complexity, the present invention may start with an excessive amount of delay and slowly reduce the delay until the receiver begins seeing a steady reduction in correlation power, indicating that the unit has begun nulling the direct path signals, thus taking advantage of the fact that the desired, direct path always arrives first.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for mitigating multiple distortion in a navigation/positioning system signal, comprising:
   receiving a positioning system signal including a direct path component and at least one multipath component utilizing a multi-element antenna having at least three antenna elements wherein each antenna element yields an element path signal based on the received positioning system signal;
   multiplying each element path signal by a complex weight; and
   summing the weighted element path signals for generating an antenna pattern, each antenna pattern corresponding to a positioning system signal source.

2. The method as claimed in claim 1, further comprising deriving each complex weight by correlating a reference signal returned from a positioning system receiver and the element path signal from each antenna element.

3. The method as claimed in claim 2, further comprising delaying the reference signal by a multiple of one chip relative to the direct path component of the positioning system signal.

4. The method as claimed in claim 3, further comprising generating a correlation matrix (R) using the equation $$R = \underline{c}'\underline{c}$$

where $\underline{c}$ is a row vector of correction values.

5. The method as claimed in claim 4, wherein each complex weight is determined from the equation $$\underline{w} = \text{inv}(3R_n + N)\underline{v}$$

where $\underline{w}$ is the vector of complex weights, R are the correlation matrices associated with 1 through n chip delays, $\underline{v}$ is the steering vector and N is a real valued matrix.

6. The method as claimed in claim 3, comprising delays at least one of 1 chip and 2 chips.

7. The method as claimed in claim 6, further comprising generating a correlation matrix (R) using the equation $$R = \underline{c}'\underline{c}$$

where $\underline{c}$ is a row vector of correlation values.

8. The method as claimed in claim 7, wherein each complex weight is determined from the equation $$\underline{w} = \text{inv}(R_1 + R_2 + N)\underline{v}$$

where $\underline{w}$ is the vector of complex weights, $R_1$ is the correlation matrix associated with one chip delay, $R_2$ is the correlation matrix associated with two chip delay, $\underline{v}$ is the steering vector and N is a real valued matrix.

9. A system for mitigating multipath distortion in a positioning system signal, comprising:
   a multi-element antenna array capable of receiving a positioning system signal including a direct path component and at least one multipath component, said multi-element antenna array having at least three antenna elements wherein each antenna element yields an element path signal based on the received positioning system signal; and
   a signal processing section capable of multiplying each element path signal by a complex weight and summing the weighted element path signals for generating an antenna pattern, each antenna pattern corresponding to a positioning system signal source.

10. The system as claimed in claim 9, wherein the signal processing section further comprises a positioning system receiver, a correlator, and a processor suitable for deriving each complex weight by correlating a reference signal returned from a positioning system receiver and the element path signal from each antenna element.

11. The system as claimed in claim 10, further comprising at least one delay for delaying the reference signal by a multiple of one chip relative to the direct path component of the positioning system signal.

12. The system as claimed in claim 11, wherein the processor generates a correlation matrix (R) using the equation $$R = \underline{c}'\underline{c}$$

where $\underline{c}$ is a row vector of correlation values received from the correlator.

13. The system as claimed in claim 12, wherein each complex weight is determined from the equation $$w=\text{inv}(3R_n+N)v$$

where $w$ is the vector of complex weights, R are the correlation matrices associated with 1 through n chip delays, $v$ is the steering vector and N is a real valued matrix.

14. The system as claimed in claim 11, comprising delays of 1 chip and 2 chips.

15. The system as claimed in claim 11, wherein the processor generates a correlation matrix (R) using the equation $$R=c'c$$

where $c$ is a row vector of correlation values received from the correlator.

16. The system as claimed in claim 15, wherein each complex weight is determined from the equation $$w=\text{inv}(R_1+R_2+N)v$$

where $w$ is the vector of complex weights, $R_1$ is the correlation matrix associated with one chip delay, $R_2$ is the correlation matrix associated with two chip delay, $v$ is the steering vector and N is a real valued matrix.

17. A navigation/positioning system receiver capable of mitigating multipath distortion in a global positioning system signal, comprising:

a multi-element antenna array capable of receiving a positioning system signal including a direct path component and at least one multipath component, said multi-element antenna array having at least three antenna elements wherein each antenna element yields an element path signal based on the received positioning system signal; and a signal processing section capable of multiplying each element path signal by a complex weight and summing the weighted element path signals for generating an antenna pattern, each antenna pattern corresponding to a positioning system signal source.

18. The navigation/positioning system receiver as claimed in claim 17, wherein the signal processing section further comprises a positioning system receiver, a correlator, and a processor suitable for deriving each complex weight by correlating a reference signal returned from a positioning system receiver and the element path signal from each antenna element.

19. The navigation/positioning system receiver as claimed in claim 18, further comprising at least one delay for delaying the reference signal by a multiple of one chip relative to the direct path component of the positioning system signal.

20. The navigation/positioning system receiver as claimed in claim 19, comprising delays of 1 chip and 2 chips.

21. A method for mitigating multipath distortion in a navigation/positioning system signal, comprising:

receiving a positioning system signal including a direct path component and at least one multipath component utilizing a multi-element antenna having at least three antenna elements wherein each antenna element yields an element path signal based on the received positioning system signal;

delaying a reference signal returned from a positioning system receiver by at least one of one chip and two chips relative to the direct path component of the positioning system signal;

deriving a complex weight for the element path signal of each antenna element by correlating the reference signal and the element path signal;

multiplying each element path signal by its complex weight; and summing the weighted element path signals for generating an antenna pattern, each antenna pattern corresponding to a positioning system signal source.

22. The method as claimed in claim 21, further comprising generating a correlation matrix (R) using the equation $$R=c'c$$

where $c$ is a row vector of correlation values.

23. The method as claimed in claim 22, wherein each complex weight is determined from the equation $$w=\text{inv}(R_1+R_2+N)v$$

where $w$ is the vector of complex weights, $R_1$ is the correlation matrix associated with one chip delay, $R_2$ is the correlation matrix associated with two chip delay, $v$ is the steering vector and N is a real valued matrix.

24. A system for mitigating multipath distortion in a positioning system signal, comprising:

a multi-element antenna array capable of receiving a positioning system signal including a direct path component and at least one multipath component, said multi-element antenna array having at least three antenna elements wherein each antenna element yields an element path signal based on the received positioning system signal; and a signal processing section including a correlator and a processor for deriving a complex weight for the element path signal from each antenna element by correlating a reference signal returned from a positioning system receiver and the element path signal, the signal processing section including at least one delay for delaying the reference signal by a multiple of one chip relative to the direct path component of the positioning system signal, wherein the processor generates a correlation matrix (R) using the equation $$R=c'c$$

where $c$ is a row vector of correlation values received from the correlator; and wherein the signal processing section multiplies each element path signal by its complex weight and sums the weighted element path signals for generating an antenna pattern, each antenna pattern corresponding to a positioning system signal source.

25. The system as claimed in claim 24, wherein each complex weight is determined from the equation $$w=\text{inv}(3R_n+N)v$$

where $w$ is the vector of complex weights, R are the correlation matrices associated with 1 through n chip delays, $v$ is the steering vector and N is a real valued matrix.

26. The system as claimed in claim 24, comprising delays of one chip and two chips.

27. The system as claimed in claim 26, wherein each complex weight is determined from the equation $$w=\text{inv}(R_1+R_2+N)v$$

where $w$ is the vector of complex weights, $R_1$ is the correlation matrix associated with one chip delay, $R_2$ is the correlation matrix associated with two chip delay, $v$ is the steering vector and N is a real valued matrix.

* * * * *